United States Patent [19]
Arcella et al.

[11] Patent Number: 4,818,562
[45] Date of Patent: Apr. 4, 1989

[54] CASTING SHAPES

[75] Inventors: Frank G. Arcella, Bethel Park; Gerald G. Lessmann, Pleasant Hills, both of Pa.

[73] Assignee: Westinghouse Electric Corp., Pittsburgh, Pa.

[21] Appl. No.: 172,991

[22] Filed: Mar. 24, 1988

Related U.S. Application Data

[63] Continuation of Ser. No. 21,845, Mar. 4, 1987, abandoned.

[51] Int. Cl.[4] ............................................. B05D 1/03
[52] U.S. Cl. ................................... 427/53.1; 427/185; 427/197; 118/429; 118/641; 118/642; 118/643; 118/DIG. 5
[58] Field of Search .................. 427/53.1, 180, 185, 427/197, 202, 203, 204, 205; 219/121 LA, 121 LE, 121 LF, 121 LP, 121 LW, 121 LY; 264/29.3, 109, 113, 125; 118/429, DIG. 5, 641–643

[56] References Cited

U.S. PATENT DOCUMENTS

| | | | |
|---|---|---|---|
| 3,957,474 | 5/1976 | Kobayashi et al. | 427/53.1 |
| 4,300,474 | 11/1981 | Livjey | 427/53.1 |
| 4,338,878 | 7/1982 | Mason et al. | 427/185 |
| 4,460,529 | 7/1984 | Schultze et al. | 264/113 |
| 4,474,861 | 10/1984 | Ecer | 219/121 LE |
| 4,525,379 | 6/1985 | Hubner et al. | 427/53.1 |
| 4,532,191 | 7/1985 | Humphries et al. | 427/53.1 |
| 4,555,610 | 11/1985 | Polad et al. | 219/121 LA |
| 4,575,330 | 3/1986 | Hull | 425/174.4 |
| 4,615,903 | 10/1986 | Miller | 427/53.1 |
| 4,644,127 | 2/1987 | La Rocca | 427/53.1 |

FOREIGN PATENT DOCUMENTS 57-026167  2/1982  Japan ............................ 219/121 LE Primary Examiner—Stan Silverman
Attorney, Agent, or Firm—Joyce L. Morrison

[57] ABSTRACT

Disclosed is a method of casting a shape. A laser or electron gun is directed at a fusible powder in a fluidized bed. The beam melts the powder and the melted powder fuses and solidifies on a surface to form the shape. Also disclosed is apparatus for casting a shape. The apparatus includes a fluidized bed containing a fluidized powder, a surface within the bed on which the shape is cast, an electron beam or laser directed at the surface, which has an energy sufficient to fuse the powder, means for controlling the level of the powder in the fluidized bed relative to the surface, and means for controlling the horizontal position of the surface relative to the beam.

126 Claims, 2 Drawing Sheets

CASTING SHAPES

This application is a continuation of application Ser. No. 07/021,845 filed Mar. 4, 1987 now abandoned.

CROSS-REFERENCE TO RELATED APPLICATION

This application is related to application Ser. No. 021,856, filed of even date by G. A. Witlow et al., titled "Energy Beam Casting of Metal Articles."

BACKGROUND OF THE INVENTION

In ancient foundry practice, molds were prepared from green pressed sand. The molds consisted of a cope (upper) and a drag (lower) portion. The cope and drag were placed together and the central cavity between them, which bore the geometry of the desired part, was filled with molten metal. When the metal had solidified, the cope and drag were removed, leaving a shape that required relatively little machining, known as "a near net shape."

In modern practices, the sand has been replaced with pressed, disposable "Bakelite" molds, various "Styrofoam" cavity formers, wax impressions, ceramic dipped wax and fired molds, vacuum investment, and other types of molds. While these molds offer various advantages over sand, it is still very expensive to create a mold. As a result, it is economically necessary to cast a large number of identical parts, so that each part need only bear a small portion of the cost of the mold. Casting prototypes, for example, where only one or two castings is needed, is very expensive. Moreover, exotic metals, such as titaniun, require expensive rammed graphite molds. The necessity for using a mold in order to cast a shape also increases the length of time needed to design and cast new shapes, because of the time required to design and manufacture new molds. While shapes can also be formed by forcing molten metal through dies so that the metal emerges cooled and solidified from the other end of the die, dies limit the casting to a single cross-sectional shape and are also expensive and time consuming to construct. Shapes can also be formed by the hot isostatic pressing of powders, but that also requires shaped containers, using expensive high pressure procedures.

SUMMARY OF THE INVENTION

We have discovered how to cast shapes without using either a mold or a die. In the process and apparatus of this invention, shapes are cast in a fluidized bed using a laser or an electron gun. The laser or electron gun fuses powder from the bed that has been thrown and collected onto a surface, where it solidifies to form a cross-section of the shape being formed. Additional powder from the bed continues to be fed by the fluidizing action onto the top of each cross-sectional layer, where it is fused by the laser or electron gun until the entire shape has been formed.

The process and apparatus of this invention offer tremendous advantages over processes that require molds or dies. Structures cast according to this invention can be cast to near net shape, which means that very little machining is required to finish the shape. By changing the composition of the powder in the bed as the part is being formed, the compositional make-up of the part can be changed throughout its dimensions. And, while parts cast in molds have a large, slowly-cooling liquid mass, which can result in the segregation of metals in alloys and the formation of large grain size microstructures, segregation of metals in alloys does not occur in parts cast according to this invention and the grain size is much smaller, resulting in stronger parts. Because the gas used to fluidize the powder sweeps away all evolved gases and vaporous fusion products, the part being formed is very clean. In fact, we have made the surprising discovery that parts of pure metal can be formed using a contaminated powder because of the cleansing effects of the process of this invention.

Another great advantage of this invention is that very little waste is produced. That is, in processes requiring molds or dies waste metal is always formed in the cracks between the cope and the drag or in the neck of the mold (gates, risers, sprue), or at the ends of the shape formed in a die. However, in this invention, the only powder consumed is the powder that is fused to form the shape; therefore, except for final machining, there is 100% raw material utilization.

Because the cross sectional geometry of the shape being formed can be controlled by computer, each part that is cast can have a different geometry simply by changing the software that controls the computer. This means that it is now economical to cast single parts (e.g., prototypes) of a particular geometry, and it is not necessary to cast hundreds or thousands of identical parts in order to recover the cost of a mold or die.

Another advantage of the process of this invention is that the undulating, circulating motion of the powder in the fluidized bed automatically feeds powder where it can be melted by the laser or electron gun. Thus, there is no need for tubes through which powder is directed into the laser or electron gun. (The use of tubes creates problems when it is necessary to change the direction of the beam and the tube is in the new path of the beam. Also, the process support structures around the part being formed tend to interfere with the movement of the tube.)

The level of the powder in the bed can be easily controlled and varied, and both the level of the powder and the flow of fresh powder into the bed can be automatically controlled. It is therefore possible to lower the level of the powder in the bed and restrike the structure being fabricated so as to glaze its surface, impart certain metallurgical properties to it, or stress relieve various portions of the surface.

A unique advantage of the process of this invention is that gases can be used to fluidize the powder that also react with the powder when it is fused. As a result, the shape being formed can change composition as the composition of the gas being used to fluidize powder is changed.

Finally, it is possible, using the method and apparatus of this invention, to form shapes that were very difficult to form by any other means. That is, it is, for example, now possible to form shapes containing voids that are inaccessible from the outside; such shapes cannot be cast using molds or dies. Shapes containing voids can now be cast because the shape, as it is being formed, can be made to extend outward or inward.

DESCRIPTION OF THE INVENTION

Figure 1:
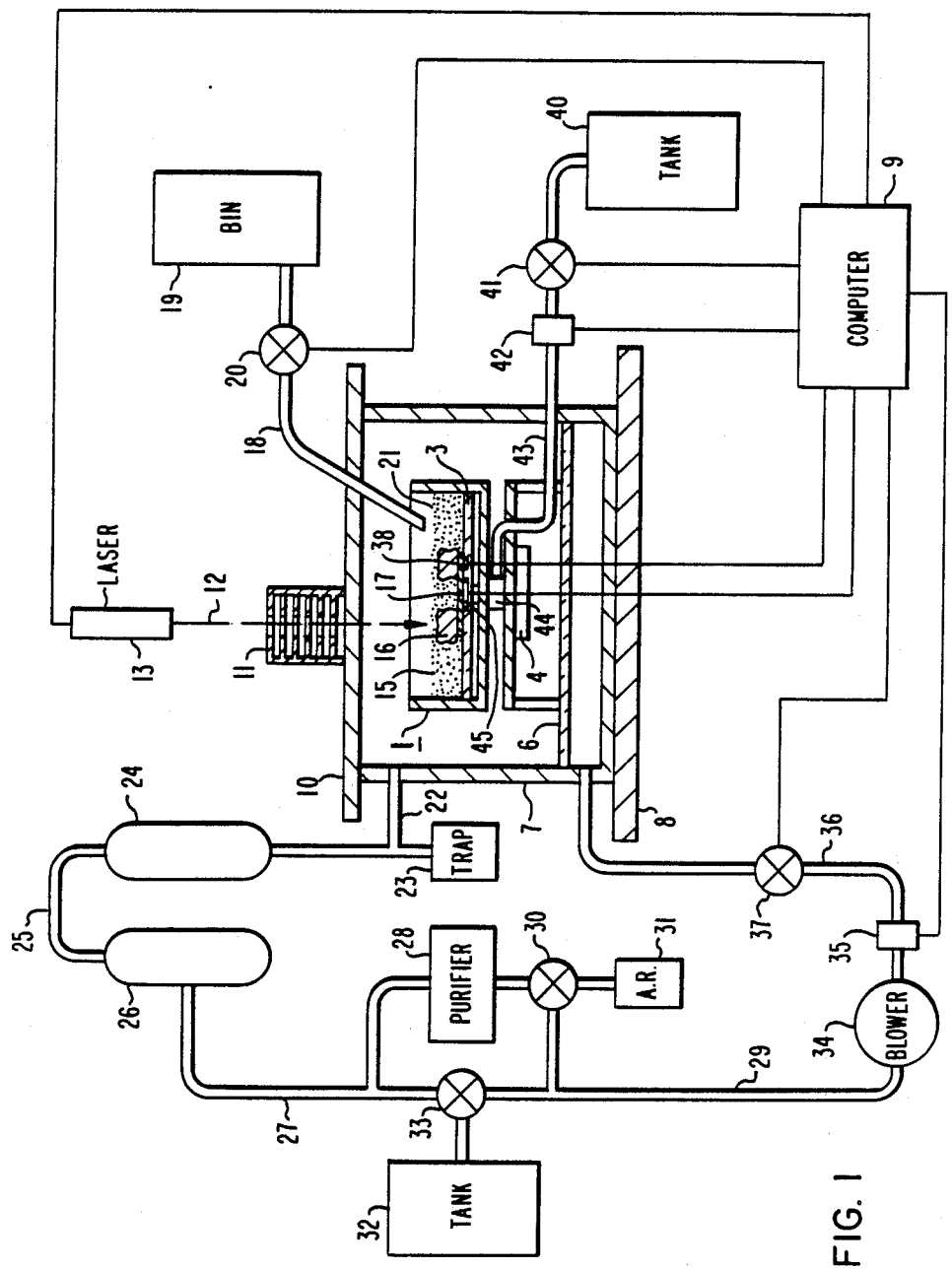
FIG. 1 is a diagrammatic view illustrating a certain presently preferred embodiment of a method and apparatus according to this invention for casting shapes.
Figure 2:
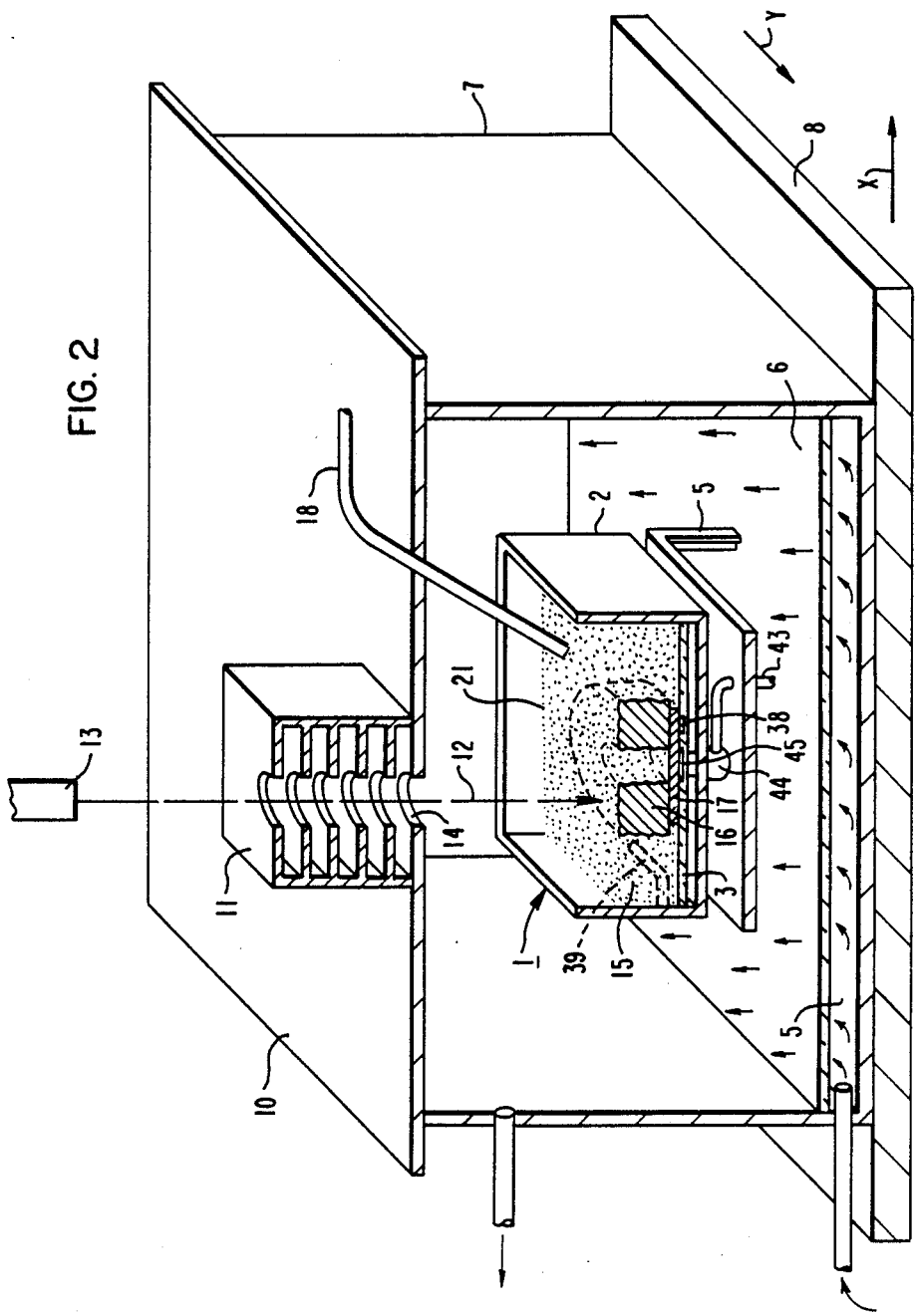
FIG. 2 is a cabinet drawing in section illustrating a certain presently preferred embodiment of the fluidized bed shown in FIG. 1.

In the drawings, a fluidized bed 1 consists of a casting chamber 2 having a porous diffuser plate 3 near its base. Fluidized bed 1 rests on a pancake motor 4, which can rotate fluidized bed 1. Supports 5 attach pancake motor 4 to diffuser plate 6 of enclosure 7. Enclosure 7 rests on table 8, which can be moved horizontally in any direction under the control of computer 9. Lid 10 of enclosure 7 remains fixed during movement of enclosure 7. Mounted on lid 10 is a labyrinth 11 which minimizes the diffusion of air back into casting chamber 2. Beam 12 of light from laser 13 passes through labyrinth 11 and aperture 14 in lid 10. Beam 12 melts powder 15, forming a shape 16 on surface 17, as hereinafter explained. Powder 15 is supplied to the fluidized bed 1 through tube 18 from storage bin 19. The flow of powder into the bed can be controlled by computer 9 by opening and closing valve 20. Powder 15 in fluidized bed 1 is fluidized to a level 21 by means of gas which passes up through diffuser plate 3. The gas flows out of fluidized bed 1 through conduit 22, where it can be discarded or cleaned and recirculated. Large particles in the gas fall into trap 23 while the remaining particles in the gas are removed by filter 24. The gas then passes through conduit 25 to condenser 26 where volatiles in the gas are condensed and removed. The gas passes through conduit 27 into purifier 28 which removes gaseous impurities. The gas can then be returned to enclosure 7 through conduit 29 or it can be released or collected by turning valve 30 to allow it to flow into collector or atmospheric release 31. New make-up gas, of the same or of a different composition, is admitted from tank 32 through valve 33, which allows the make-up gas to pass directly into line 29, or to pass through purifier 28 before it passes into line 29. Blower 34 forces the gas to circulate through enclosure 7. A flow meter 35 monitors the flow of gas through line 36 and enables computer 9 to control the flow of gas into enclosure 7 by means of valve 37. Acoustic device 38, or other sensor device, measures the height of shape 16 and the depth of the powder over the surface of shape 16, and electric resistance heater 39 may be used to heat the bed and the powder. Gas to fluidized bed 1 is supplied separately, from tank 40, through computer controlled valve 41 and computer monitored flow meter 42 into line 43 and rotary connection 44 up through diffuser plate 3. A lift device 45, controlled by computer 9, can raise or lower surface 17 in fluidized bed 1.

The apparatus operates as follows. Blower 34 is turned on to purge the chamber through diffuser plate 6. Powder is admitted to fluidized bed 1 and valve 41 is also turned on to permit gas from tank 40 to fluidize powder 15 through plate 3. Valve 41 is closed, leaving a layer of powder on surface 17. (A level of about 1/32 to about 1 inch above surface 17 is suitable under most conditions.) Laser 13 is turned on and laser beam 12 melts powder that is over surface 17, causing the melted powder to fuse onto surface 17, where it is cooled by the flowing gases in the fluidized bed and solidifies. Computer 9 moves surface 17 by means of table 8 in a horizontal direction (or rotates surface 17 in a horizontal plane by means of pancake motor 4) so that the powder which fuses and solidifies on surface 17 forms a pattern. This pattern represents a horizontal slice or cross-section through the very bottom of the part that is being cast. (A part that is not flat or not horizontal or the bottom can be made either by stepping the succeeding horizontal layers on by using a surface 17 that is correspondingly non-flat or non-horizontal.) As the powder in the bed is fused into sequential layers, forming part 16, part 16 increases in height and computer 9 determines how much, if any, additional powder is needed to raise powder level 21 or to replace the powder that was used in forming the part, and admits the additional powder by opening valve 20. Because the fluidizing action of the bed throws powder over the top of shape 16, it is usually not necessary to add new powder for each layer unless a higher layer overhangs the preceding layer and must be supported by the powder. Computer 9 can transmit a signal through acoustic device 38 to measure the amount of powder above surface 17 and the height of shape 16. The level of powder above surface 17 can be raised in several ways if it has fallen too low. Computer 9 can lower surface 17 by means of lift device 45, so that the level of powder in the bed 1 is maintained slightly above the level of shape 16 as it is being cast. Alternatively, instead of lowering surface 17, computer 9 could raise the level 21 of powder in fluidized bed 1 by (1) increasing the gas pressure admitted to the bottom of the bed by opening valve 41, or (2) admitting additional powder into the bed by opening valve 20. It is preferable either to lower surface 17 or to increase the gas pressure as this permits more precise control of the relationship between level 21 of powder 15 and the top surface of part 16. After the first horizontal cross-section of the shape has been formed, valve 41 is again opened to admit gas from tank 40 into enclosure 7, again fluidizing powder 15, throwing a new layer of powder over the top of part 16. If higher layers of part 16 are to overhang lower layers, it is necessary for the powder in bed 1 to be unfluidized during melting by the laser or electron beam, and for the level of the unfluidized powder to be high enough to support the overhang. If higher layers do not overhang, however, it is not necessary to turn off the fluidizing gas during the melting of the powder. The computer then directs table 8 to move in the horizontal X-Y plane (or directs pancake motor 4 to rotate) in such a way as to form the second horizontal cross-section of the shape. The fused powder formed in the second layer melts a small portion of the powder fused in forming the first layer thereby bonding the second layer to the first layer. Exposed surfaces of the shape can be restruck, if desired, to alter their metallurgical properties, or for smoothness, by lowering the powder level and reheating with the laser or electron beam. The process continues for each succeeding horizontal cross-section through the shape until the entire shape has been formed. The shape is then removed from the bed and is machined to final tolerances.

Cladding can also be deposited on a substrate using this invention by simply applying only one or two layers of powder to the substrate. Also, broken or chipped parts can be repaired by using the parts as the substrate, by building horizontal cross-sectional layers over the defective portion.

There are many alternative procedures by which the method of this invention can be practiced. For example, while computer aided drafting (CAD) and computer aided engineering (CAE) can easily provide the X-Y coordinates of every cross-section through any shape, and computer numerical control (CNC) can enable the computer to not only control the height and horizontal position of surface 17, but also the flow of powder and gas into the fluidized bed, it is clearly not necessary to use a computer. That is, surface 17 could be moved manually, with or without guides, so as to provide each cross-sectional layer. However, it is obvious that manual control, or even motor driven manual control, cannot approach the precision of control by a computer.

Alternatively, instead of moving surface 17, it is also possible to move laser beam 12. This can be accomplished either by reflecting laser beam 12 from a mirror and moving the mirror (for example, on a gantry device), or by actually moving laser 13. However, since lasers powerful enough to fuse most metal powders are so large that they are difficult to move easily, it is preferable to move either the laser beam by means of a mirror or to move surface 17, either within the bed or by moving the entire bed.

Any kind of powder that can be fused by an electron gun or a laser can be used in this invention. Examples of such powders include metals, ceramics, and plastics. Examples of ceramics include various glass compositions, which may contain the oxides of elements such as titanium, zirconium, sodium, boron, magnesium, silicon, or other glass-forming elements. Examples of plastics that may be used include thermoplastic resins and thermosetting resins including acrylics, polyesters, polyurethanes, polyethylene, polypropylene, polyamides, epoxies, polyimides, phenyl formaldehyde resins, and other resins. The particles may also consist of mixtures of plastics, metals, and/or ceramics. For example, a mixture of metal particles and ceramic particles could be used to form a cermet structure. If mixtures of different particles are used, care should be taken to use particles that do not separate within the fluidized bed. This can be accomplished by using particles with similar densities or by adjusting the shape of particles of different densities so that they are suspended equally by the gas flow within the fluidized bed.

The particles are preferably metals because this invention is most useful in forming castings of metals. If the particles are metals, they may be particles of a single metal or particles of a mixture of different metals. If the particles are a mixture of particles of different metals, alloys (called "elemental alloys") will be formed in the casting. The particles may also be particles of a metal alloy (known as "prealloy" particles), in which case the metal casting will also have an alloy composition. Because particles, especially if they are large, may not intermix homogeneously when they melt, and because certain elements may be more easily volatilized from elemental alloy powders, a different elemental alloy composition may be needed to produce a part that has the same composition as a part made from a prealloy. Examples of suitable metals include stellite (a cobalt alloy), stainless steel, aluminum, and titanium. The preferred metal is titanium because it is difficult to form titanium castings by other means; titanium alloys are particularly preferred. An example of a titanium alloy from which castings are frequently made for aerospace applications has the composition 90% titanium (all percentages herein are by weight based on total composition weight), 6% aluminum, and 4% vanadium.

Titanium is often prepared by treating titanium chloride with sodium to form titanium sponge metal that is contaminated with sodium chloride. While the titanium metal particles are washed to remove the sodium chloride, the resulting titanium nevertheless can contain about 0.15% sodium chloride. Since the presence of sodium chloride in a titanium casting significantly weakens the casting, it is necessary to use expensive uncontaminated titanium powder prepared, for example, by a rotating electrode process, in order to obtain strong titanium castings. We have found, however, that titanium that is contaminated with about 0.15% sodium chloride can be purified during the process of forming a casting according to this invention, so that the resulting casting contains less than 150 ppm of sodium chloride. (Magnesium, sodium, and other contaminants, are also removed during the process of this invention.) As a result, the less expensive contaminated powder can be used and the castings are much stronger and more easily welded than they would be if the entire 0.15% sodium chloride were present.

The powder in the bed can be fused by means of either an electron gun or a laser. A laser is preferred because it does not require vacuum conditions as does an electron gun. However, the vacuum conditions required by an electron gun can be partially met by using an "out of vacuum" electron beam source (which is commercially available). If a laser is used, the laser must be powerful enough to fuse the powder in the fluidized bed. Depending upon the powder composition, many different types of lasers may have enough energy to meet this requirement. However, if the powder is a metal, a $CO_2$ laser is preferred because $CO_2$ lasers can easily produce enough energy to melt most metals.

The laser beam can be integrated so that surface 17 can be moved rapidly, covering the entire lithography of the cross-section. Also, the laser beam can be oscillated in a variety of directions relative to the direction of travel of surface 17. A continuous laser or a pulse laser can be used. It is also possible to combine several lasers or electron guns to obtain greater heat or faster processing. On the other hand, the beam from a single laser or electron gun can be split so that many identical parts can be formed simultaneously on the same surface, or more than one laser or electron gun could be used to form more than one identical part at the same time. If the powder is easily fused, or the laser or electron gun is powerful enough, it can be passed through a mask so that the entire cross-sectional area can be formed at the same time. Normally, however, it will be necessary to focus the laser or electron gun in order to concentrate sufficient energy to fuse the powder. The laser or electron gun is preferably at a 90° angle to powder level 21 in order to obtain the maximum power density and a controlled cross-section, but other angles can be used if desired.

While it is not necessary, in order to make the best use of the power of the laser or electron gun, it may be desirable to preheat the powder and also to heat the powder in the fluidized bed in order to keep the part at a more uniform temperature and thereby provide heat treatment and stress relief. Also, a heated powder may require less laser or electron gun energy to fuse the powder. Such heating may, in addition, permit the fabrication of structures from materials, such as tungsten, which are brittle and difficult to work with. Heating can be accomplished in many different ways. For example, electrical heater 39 in the drawing may be used to heat the entire fluidized bed or the powder within the bed. It is also possible to heat the fluidizing gas, but this will be less efficient.

The gas used to fluidize the powder may be either an inert gas or a gas that reacts with the powder under the heat of the laser or electron gun. Whether a gas is inert or not depends upon the particular gas and powder being used. Common gases that can be inert include argon, helium, nitrogen, and neon. A reactive gas, such as methane, can be used with various metals to form carbides. A reactive gas, such as nitrogen, can be used with metals to form nitrides. The particular gas used to fluidize the powder can be changed as the shape is being formed, so that the shape consists of a metal or metal alloy throughout most of its mass, but has a metal carbide or metal nitride composition at one portion, such as the top, where the shape may be subject to more stress or abrasion. This procedure is particularly useful in forming shapes such as turbine blades and machine parts.

We claim:

1. A method of casting a shape comprising directing a laser or electron gun at fusible powder in a fluidized bed, where said beam melts said powder and said melted powder fuses and solidifies on a surface, forming said shape.

2. A method according to claim 1 wherein said powder is selected from the group consisting of metals, ceramics, plastics, and mixtures thereof.

3. A method according to claim 1 wherein said powder is a mixture of different kinds of particles.

4. A method according to claim 3 wherein said powder is a mixture of metal particles and ceramic particles.

5. A method according to claim 2 wherein said powder is metal powder.

6. A method according to claim 5 wherein said powder is a mixture of at least two different metals.

7. A method according to claim 5 wherein said powder comprises titanium.

8. A method according to claim 7 wherein said titanium is contaminated with an element selected from the group consisting of sodium, magnesium, chlorine, and mixtures thereof.

9. A method according to claim 5 wherein said metal is an alloy.

10. A method according to claim 9 wherein said alloy is an alloy of titanium.

11. A method according to claim 10 wherein said alloy has the approximate composition 90% Ti-6% Al-4% V.

12. A method according to claim 5 wherein said powder comprises tungsten.

13. A method according to claim 1 wherein the composition of said powder is changed as said shape is formed.

14. A method according to claim 1 wherein said powder in said bed is heated.

15. A method according to claim 14 wherein said powder is heated by an electrical resistance heater in said fluidized bed.

16. A method according to claim 1 wherein said powder is fluidized with a gas that reacts with said powder when it is fused.

17. A method according to claim 16 wherein said gas is methane and said powder is a metal, whereby a metal carbide is formed.

18. A method according to claim 17 wherein said gas is nitrogen and said powder is a metal, whereby a metal nitride is formed.

19. A method according to claim 1 wherein said powder is fluidized with an inert gas.

20. A method according to claim 1 wherein said beam is a laser beam.

21. A method according to claim 20 wherein said laser beam is from a $CO_2$ laser.

22. A method according to claim 1 wherein said powder is not fluidized when it is melted.

23. A method according to claim 1 wherein said beam is directed downward at 90° to said surface.

24. A method according to claim 1 wherein more than one beam is directed at the same powder.

25. A method according to claim 1 wherein a single beam is split and is directed at powder in different areas of said fluidizing bed, whereby two identical shapes are formed on said surface.

26. A method according to claim 1 wherein at least two beams are directed at powder in different areas of said fluidized bed, whereby two identical shapes are formed on said surface.

27. A method according to claim 1 wherein said shape is lowered in said fluidized bed as it forms, so that the top of said powder in said bed is higher than said shape.

28. A method according to claim 1 wherein the level of said powder in said fluidized bed is raised as said shape forms so that said level is above the top of said shape.

29. A method according to claim 28 wherein the level of said powder in said fluidized bed is raised by increasing the pressure of the gas used to fluidize said powder.

30. A method according to claim 28 wherein the level of said powder in said fluidized bed is raised by adding powder to said bed.

31. A method according to claim 1 wherein said powder that forms said shape is replaced by adding more powder to said bed.

32. A method according to claim 1 wherein the level of said powder above said shape is determined by a sensor.

33. A method according to claim 1 wherein said beam is fixed and said surface moves horizontally.

34. A method according to claim 33 wherein said surface, is moved manually.

35. A method according to claim 33 wherein the horizontal movement of said surface is controlled by a computer.

36. A method according to claim 1 wherein said surface is fixed and said beam is moved relative to said surface.

37. A method according to claim 36 wherein said beam is moved manually.

38. A method according to claim 36 wherein the movement of said beam is controlled by a computer.

39. A method according to claim 1 wherein said surface is horizontal and flat.

40. A method of casting a near net shape comprising:
   (A) fluidizing a laser-fusible powder in a fluidized bed to a level slightly higher than the level of a surface within said fluidized bed;
   (B) stopping said fluidizing of said powder, whereby a layer of said powder is deposited on said surface;
   (C) directing a laser beam downward at said layer of powder while changing the horizontal position of said surface relative to said laser beam, whereby said powder fuses on said surface;
   (D) fluidizing said powder to a level slightly higher than the top of said fused powder; and
   (E) repeating steps (B), (C), and (D) until said near net shape is completed.

41. A method of forming a metal casting of a near net shape comprising:

(A) fluidizing metal powder in a fluidized bed to a level about 1/32 to about 1 inch above the level of a horizontal surface within said fluidized bed;

(B) stopping said fluidizing of said powder, whereby a layer of said powder is deposited on said surface;

(C) directing a $CO_2$ laser beam having a power sufficient to melt said metal powder downward at said layer of powder, while changing the horizontal position of said horizontal surface relative to said laser beam, whereby said melted powder fuses on said surface and solidifies, forming a horizontal cross-section of said near net shape;

(D) fluidizing said powder in said fluidized bed so that said level is about 1/32 to about 1 inch above the top of said horizontal cross section; and (E) repeating steps (B), (C), and (D) until said metal casting is formed.

42. A method according to claim 41 wherein said level is maintained by lowering said horizontal surface.

43. A method according to claim 42 wherein said level is maintained by raising the level of said powder.

44. A method according to claim 40 wherein said powder is selected from the group consisting of metals, ceramics, plastics, and mixtures thereof.

45. A method according to claim 40 wherein said powder is a mixture of different kinds of particles.

46. A method according to claim 45 wherein said powder is a mixture of metal particles and ceramic particles.

47. A method according to claim 44 wherein said powder is a metal powder.

48. A method according to claim 47 wherein said powder is a mixture of at least two different metals.

49. A method according to claim 47 wherein said powder comprises titanium.

50. A method according to claim 49 wherein said titanium is contaminated with an element selected from the group consisting of sodium, magnesium, chlorine, and mixtures thereof.

51. A method according to claim 47 wherein said metal is an alloy.

52. A method according to claim 51 wherein said alloy is an alloy of titanium.

53. A method according to claim 52 wherein said alloy has the approximate composition 90% Ti-6% Al-4% V.

54. A method according to claim 47 wherein said powder comprises tungsten.

55. A method according to claim 40 wherein the composition of said powder is changed as said shape is formed.

56. A method according to claim 40 wherein said powder in said bed is heated.

57. A method according to claim 56 wherein said powder is heated by an electrical resistance heater in said fluidized bed.

58. A method according to claim 40 wherein said powder is fluidized with a gas that reacts with said powder when it is fused.

59. A method according to claim 58 wherein said gas is methane and said powder is a metal, whereby a metal carbide is formed.

60. A method according to claim 59 wherein said gas is nitrogen and said powder is a metal, whereby a metal nitride is formed.

61. A method according to claim 40 wherein said powder is fluidized with an inert gas.

62. A method according to claim 40 wherein said laser beam is from a $CO_2$ laser.

63. A method according to claim 40 wherein said beam is directed downward at 90° to said surface.

64. A method according to claim 40 wherein said laser beam is split and is directed at powder in different areas of said fluidizing bed, whereby two indentical shapes are formed on said surface.

65. A method according to claim 40 wherein the level of said powder in said fluidized bed is rasied by increasing the pressure of the gas used to fluidize said powder.

66. A method according to claim 40 wherein the level of said powder in said fluidized bed is raised by adding powder to said bed.

67. A method according to claim 40 wherein said powder that forms said shape is replaced by adding more powder to said bed.

68. A method according to claim 40 wherein the level of said powder above said shape is determined by a sensor.

69. A method according to claim 40 wherein said beam is fixed and said surface moves horizontally.

70. A method according to claim 69 wherein said surface is moved manually.

71. A method according to claim 69 wherein the horizontal movement of said surface is controlled by a computer.

72. A method according to claim 40 wherein said surface is fixed and said laser beam is moved relative to said surface.

73. A method according to claim 72 wherein said beam is moved manually.

74. A method according to claim 72 wherein the movement of said laser beam is controlled by a computer.

75. A method according to claim 40 wherein said surface is horizontal and flat.

76. A method according to claim 41 wherein said metal powder is a mixture of at least two different metals.

77. A method according to claim 41 wherein said powder comprises titanium.

78. A method according to claim 77 wherein said titanium is contaminated with an element selected from the group consisting of sodium, magnesium, chlorine, and mixtures thereof.

79. A method according to claim 41 wherein said metal is an alloy.

80. A method according to claim 79 wherein said alloy is an alloy of titanium.

81. A method according to claim 80 wherein said alloy has the approximate composition 90% Ti-6% Al-4% V.

82. A method according to claim 41 wherein said metal powder comprises tungsten.

83. A method according to claim 41 wherein the composition of said metal powder is changed as said shape is formed.

84. A method according to claim 41 wherein said metal powder in said bed is heated.

85. A method according to claim 84 wherein said metal powder is heated by an electrical resistance heater in said fludized bed.

86. A method according to claim 41 wherein said metal powder is fluidized with a gas that reacts with said metal powder when it is fused.

87. A method according to claim 86 wherein said gas is methane, whereby a metal carbide is formed.

88. A method according to claim 86 wherein said gas is nitrogen, whereby a metal nitride is formed.

89. A method according to claim 41 wherein said metal powder is fluidized with an inert gas.

90. A method according to claim 41 wherein said beam is directed downward at 90° to said surface.

91. A method according to claim 41 wherein said laser beam is split and is directed at powder in different areas of said fluidizing bed, whereby two identical shapes are formed on said surface.

92. A method according to claim 41 wherein the level of said metal powder in said fluidized bed is raised by increasing the pressure of the gas used to fluidize said metal powder.

93. A method according to claim 92 wherein the level of said metal powder in said fluidized bed is raised by adding metal powder to said bed.

94. A method according to claim 41 wherein said metal powder that forms said shape is replaced by adding more metal powder to said bed.

95. A method according to claim 41 wherein the level of said metal powder above said shape is determined by a sensor.

96. A method according to claim 41 wherein said beam is fixed and said surface moves horizontally.

97. A method according to claim 96 wherein said surface is moved manually.

98. A method according to claim 96 wherein the horizontal movement of said surface is controlled by a computer.

99. A method according to claim 41 wherein said surface is fixed and said beam is moved relative to said surface.

100. A method according to claim 99 wherein said beam is moved manually.

101. A method according to claim 99 wherein the movement of said beam is controlled by a computer.

102. Apparatus for casting a shape comprising:
(A) a fluidized bed;
(B) a surface within said bed;
(C) an electron gun or a laser having an energy sufficient to fuse powder within said fluidized bed, where the output beam of said electron gun or said laser is directed at said surface;
(D) means for controlling the level of powder in said fluidized bed relative to said surface;
(E) means for controlling the horizontal position of said surface relative to said beam.

103. Apparatus according to claim 102 including means for changing the composite of power in said fluidized bed as said shape is cast.

104. Apparatus according to claim 102 including means for heating powder in said bed.

105. Apparatus according to claim 104 wherein said means for heating said powder is an electrical resistance heater placed in said fluidized bed.

106. Apparatus according to claim 102 wherein said beam is a laser beam.

107. Apparatus according to claim 104 including means for rapidly oscillating said laser beam over said surface as said surface moves horizontally.

108. Apparatus according to claim 102 wherein said laser beam is from a $CO_2$ laser.

109. Apparatus according to claim 102 wherein said beam is directed downward at 90° to said surface.

110. Apparatus according to claim 102 wherein more than one beam is directed at said surface.

111. Apparatus according to claim 102 including means for splitting a single beam into at least two beams, and for directing each beam at different areas of said surface in said fluidizing bed, whereby identical shapes can be formed on said surface.

112. Apparatus according to claim 102 wherein at least two beams can be directed at different areas of said surface in said fluidized bed, whereby two identical shapes can be formed on said surface.

113. Apparatus according to claim 102 including means for lowering said shape in said fluidized bed as it is formed.

114. Apparatus according to claim 102 including means for raising the level of powder in said fluidized bed as said shape is formed.

115. Apparatus according to claim 114 wherein said means for raising the level of said powder in said fluidized bed is means for increasing the pressure of the gas used to fluidize said powder.

116. Apparatus according to claim 102 including means for adding powder to said bed.

117. Apparatus according to claim 102 including sensor means for determining the level of powder in said fluidized bed that is above said shape.

118. Apparatus according to claim 102 wherein said beam is fixed and said surface is horizontally moveable.

119. Apparatus according to claim 118 wherein said surface is manually moveable.

120. Apparatus according to claim 118 wherein the horizontal movement of said surface is controlled by a computer.

121. Apparatus according to claim 102 wherein said surface is fixed and said beam is moveable relative to said surface.

122. Apparatus according to claim 121 wherein said beam is manually moveable.

123. Apparatus according to claim 121 wherein the movement of said beam is controlled by a computer.

124. Apparatus according to claim 102 wherein said surface is horizontal and flat.

125. Apparatus for casting a near net shape comprising:
(A) a fluidized bed having surface therein;
(B) means for fluidizing powder within said bed to a level slightly above the level of said surface;
(C) a laser, the beam of which is directed downward at said surface;
(D) means for changing the horizontal position of said surface relative to said laser beam; and
(E) means for changing the level of said powder in said fluidized bed relative to said surface.

126. Apparatus for forming a metal casting of a near net shape comprising:
(A) a fluidized bed;
(B) a horizontal surface within said fluidized bed;
(C) means for fluidizing metal powder in said fluidized bed to a level about 1/32 to about 1 inch above said horizontal surface;
(D) a $CO_2$ laser that produces a laser beam having a power sufficient to melt said fluidized metal powder above said horizontal surface;
(E) means for directing said laser beam at said surface;
(F) means for changing the horizontal position of said horizontal surface relative to said laser beam; and
(G) means for changing the level of said metal powder in said fluidized bed relative to said horizontal surface.

* * * * *